(12) United States Patent
Miao et al.

(10) Patent No.: US 12,011,833 B2
(45) Date of Patent: Jun. 18, 2024

(54) SYSTEM AND METHOD FOR ROBOT CONTROL BASED ON MEMRISTIVE CROSSBAR ARRAY

(71) Applicant: NANJING UNIVERSITY, Nanjing (CN)

(72) Inventors: Feng Miao, Nanjing (CN); Shijun Liang, Nanjing (CN); Cong Wang, Nanjing (CN); Zaizheng Yang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 318 days.

(21) Appl. No.: 17/763,495

(22) PCT Filed: Nov. 1, 2019

(86) PCT No.: PCT/CN2019/114958
§ 371 (c)(1),
(2) Date: Mar. 24, 2022

(87) PCT Pub. No.: WO2021/072817
PCT Pub. Date: Apr. 22, 2021

(65) Prior Publication Data
US 2022/0331952 A1 Oct. 20, 2022

(30) Foreign Application Priority Data

Oct. 18, 2019 (CN) .......................... 201910993530.3

(51) Int. Cl.
*B25J 9/16* (2006.01)
*G06N 3/063* (2023.01)

(52) U.S. Cl.
CPC .............. *B25J 9/161* (2013.01); *B25J 9/163* (2013.01); *B25J 9/1664* (2013.01); *G06N 3/063* (2013.01)

(58) Field of Classification Search
CPC . B25J 9/161; B25J 9/163; B25J 9/1664; B25J 13/08; G06N 3/063; G06N 3/09; G06N 3/065
See application file for complete search history.

(56) References Cited

U.S. PATENT DOCUMENTS

9,015,093 B1 * 4/2015 Commons .......... G01C 21/3602
706/26
9,779,355 B1 * 10/2017 Leobandung ............ G06N 3/04
11,597,394 B2 * 3/2023 Yeh ........................ G06N 5/045
(Continued)

*Primary Examiner* — Seokjin Kim
(74) *Attorney, Agent, or Firm* — CBM PATENT CONSULTING, LLC (57) ABSTRACT

A system and a method for robot control based on a memristive crossbar array comprises a sensor group, an input sensing signal modulator, a neuromorphic circuit, an output control signal modulator, an output device, an external supervisor module and a training controller; the neuromorphic circuit performs robot control, and the main part thereof is a memristor crossbar array with a fully-connected neural network structure, wherein a differential amplifying circuit and a multiplexing switch in the neuromorphic circuit are connected to the memristor crossbar array, an input signal vector is multiplied by a weight matrix stored in the memristor crossbar array, and one or more channels of analog output signals are obtained through the differential amplifying circuit.

10 Claims, 6 Drawing Sheets

(56) References Cited

U.S. PATENT DOCUMENTS

| | | | |
|---|---|---|---|
| 2009/0163826 A1* | 6/2009 | Mouttet | H03K 19/177 |
| | | | 600/544 |
| 2014/0188771 A1* | 7/2014 | Modha | G06N 3/08 |
| | | | 706/26 |
| 2017/0011290 A1* | 1/2017 | Taha | G06N 3/065 |
| 2017/0213134 A1* | 7/2017 | Beyeler | G06F 18/2136 |
| 2018/0311817 A1* | 11/2018 | Laurent | B25J 9/163 |
| 2019/0258254 A1* | 8/2019 | Kadin | G06N 5/043 |
| 2020/0134461 A1* | 4/2020 | Chai | G06N 3/084 |
| 2020/0189603 A1* | 6/2020 | Yeh | B60W 40/09 |
| 2020/0242448 A1* | 7/2020 | Strachan | G06N 3/08 |
| 2020/0342301 A1* | 10/2020 | Miao | G06F 17/153 |
| 2021/0201125 A1* | 7/2021 | Taha | G06N 3/065 |

\* cited by examiner

SYSTEM AND METHOD FOR ROBOT CONTROL BASED ON MEMRISTIVE CROSSBAR ARRAY

TECHNICAL FIELD

The present invention relates to the field of automatic control of a memristive crossbar array, in particular to a system and a method for robot control based on a memristive crossbar array.

BACKGROUND

The existing intelligent robot technology adopts a digital control circuit with a digital processor as a core in hardware aspect and realizes intelligent application based on various neural network algorithms in software aspect. Such a robot driven by a neural network algorithm requires low power consumption and high speed in processing; however, the current application platform such as a robot relies on the existing digital control circuit to drive the neural network algorithm, which brings severe challenges to its hardware.

Software aspect of such an intelligent robot comprises complex information processing and a large amount of computation. The information control flow of the software is as follows. A physical quantity in an environment is acquired and converted into a digital signal through various sensors such as image sensors, temperature sensors, pressure sensors and sound sensors, and the digital signal is transmitted to a digital processor through digital communication. In the digital processor, the information is processed according to a neural network algorithm. In a general neural network algorithm model, the information process is composed of a plurality of processing processes with similar layer structures. Each layer of network contains a large number of weight parameters, and the digital information and the network weight parameters in each layer of network are subjected to matrix multiplication operation and nonlinear operation to obtain an output of the layer and further convert the output into an input of the next layer. After the neural network algorithm is performed, input information is converted into a computation result, and then a control signal is modulated according to the output result to control various intelligent actions of the robot. In order to enable the robot to have adaptability and the learning ability, the neural network also needs to perform certain feedback training. The most common training method is error back-propagation and gradient descent, and these training methods involve a large amount of parameter adjustments and computations.

The hardware of such a robot is mainly assembled by parts responsible for sensing information, processing information and controlling motions. The core responsible for information processing is mainly designed with a digital controller circuit. The integrated digital chip contained in the digital controller circuit is a logic circuit based on complementary metal oxide semiconductor technology and with a transistor as a basic element, and the logic circuit mainly has a universal processor, a memory and other circuit modules. One of the major bottlenecks limiting performance of the logic circuit when performing computations is due to a limited speed of information exchange between a memory and a processor, which is particularly evident in the training stage. For a sensing part, a sensor is generally made by physical effects, the element has different electrical performances due to the influence of the physical quantity in the environment, and the performances are electrically analog signals. However, in order to match with a digital processing system, after the sensor element converts the analog quantity in the environment into the electrical analog quantity, the analog quantity is converted into a digital signal in conjunction with an analog-to-digital converter, and the digital signal is transmitted to a control circuit at a later stage in a communication manner for subsequent signal communication and computation processing.

One disadvantage in the prior art is high power consumption, specifically, performing a large scale of neural network algorithm on a digital circuit requires a great number of operations, resulting in very high power consumption. However, the applications such as a robot can only carry limited power, and the power consumption of each part in the robot is required to be as low as possible. There is a contradiction between the above two.

Another disadvantage in the prior art is high complexity, wherein one source of the complexity is computation operations, specifically, process information needs to be repeatedly processed in a memory and a computation unit to obtain a final result; and another source of the complexity is that the processing needs to acquire and convert the analog information in the environment into digital signals and then act the digital signals on an output system after operation processing, thereby affecting the environment. This conversion process also introduces redundant steps. The high complexity of the technology limits further improvement of its performances. Moreover, the high complexity also brings a problem of too long response time of the system.

SUMMARY

Objective: in order to overcome the defects in the prior art, the present invention provides a robot control system based on a memristive crossbar array, which solves the problems of high power consumption, high complexity and slow response in the prior art, and also provides a robot control method based on a memristive crossbar array.

Technical schemes: in one aspect, the robot control system based on a memristive crossbar array provided by the present invention comprises: a sensor group, an input sensing signal modulator, a neuromorphic circuit, an output control signal modulator, an output device, an external supervisor module and a training controller, wherein the neuromorphic circuit comprises N groups of cascaded memristor circuits, and the memristor circuit comprises a memristor crossbar array, a differential amplifying circuit and a multiplexing switch, wherein N≥1, the sensor group is configured for acquiring relevant information in an environment and converting respective physical information quantity in the environment into electric quantity;

the input sensing signal modulator is configured for amplifying the electric quantity transmitted by each sensor to a proper range and modulating signal waveforms, and a number of the sensors corresponds to a number of channels of input signals one by one;

the differential amplifying circuit and the multiplexing switch are connected to the memristor crossbar array, an input signal vector is multiplied by a weight matrix stored in the memristor crossbar array through the memristor crossbar array, and then one or more channels of analog output signals are obtained through the differential amplifying circuit;

the multiplexing switch is configured for performing weight updating operation on the memristor in the training process, and the other end of the multiplexing switch is connected with the training controller;

the output control signal modulator is configured for connecting an output end of the neuromorphic circuit, modulating the analog output signals into signals that are matched with and drive the output device;

the output device is configured for receiving the modulated signals to drive a robot to generate respective reactions;

the external supervisor module is configured for determining whether a route of a robot is correct or not according to responses made by the robot in the training stage and controlling the positive and negative of pulses entering the memristor; and the training controller is configured for controlling an electrical stimulation signal to flow into relevant specific memristor in combination with results of the external supervisor module and in conjunction with the multiplexing switch according to the signals given by current sensor and output signals of the neuromorphic circuit in the training stage, so that a weight of the memristor is replaced.

Furthermore, the neuromorphic circuit has a neural network structure in a circuit structure, and an electrical conductance value of the memristor in the neuromorphic circuit is used as a weight value of synapses in the neural network.

Furthermore, the memristor crossbar array is composed of word lines, bit lines and memristors at the cross points, and the memristor crossbar array allows electronic elements of other non-memristors to be added without departing from the spirit of the present invention on the premise of keeping the circuit network structure thereof.

Furthermore, the system further comprises a power supply module for supplying all other modules with power; and a global clock module for coordinating other different modules to operate in an orderly and cooperative manner.

Furthermore, the system further comprises:

a pulse generating device, connected with the training controller, for generating electrical excitation for updating the weight of the memristor.

Furthermore, the neuromorphic circuit further comprises a nonlinear element connected to the memristor array.

In another aspect, the present invention provides a robot control method based on a memristive crossbar array, which comprises:

(1) converting, by a sensor group, respective physical quantity into an electric quantity as an input signal after acquiring relevant information in an environment;

(2) inputting the input signal into an input sensing signal modulator for modulating to obtain the modulated input signal;

(3) inputting the modulated input signal into a memristor crossbar array of a neuromorphic circuit, obtaining an output signal which is a product of the input signal and a weight matrix stored in the memristor crossbar array through the memristor crossbar array, then obtaining one path of analog output signals through the differential amplifying circuit, and driving a robot to generate respective reactions after an output device receives the analog output signals;

(4) supervising, by an external supervisor module, a robot behavior and iterating steps (5) and (6) until a behavior mode of the robot is updated into an expected behavior mode;

(5) determining, by the external supervisor module, whether the robot behavior is correct or not and sending the result to a training controller; and (6) controlling, by the training controller, an electrical stimulation signal to flow into relevant specific memristor such that a weight of the memristor is replaced and the weight value of the neuromorphic circuit is changed, wherein the determination result is specifically that: if the behavior is correct, a larger weight is strengthened and a smaller weight is weakened; if the behavior is wrong, the smaller weight is strengthened and the larger weight is weakened.

Furthermore, the neuromorphic circuit has a neural network structure in a circuit structure, and an electrical conductance value of the memristor in the neuromorphic circuit is used as a weight value of synapses in the neural network.

Furthermore, the memristor crossbar array is composed of word lines, bit lines and memristors at the cross points, and the memristor crossbar array allows electronic elements of other non-memristors to be added without departing from the spirit of the present invention on the premise of keeping the circuit network structure thereof.

Furthermore, the method further comprises supplying, by a power supply module, other modules with power; and coordinating, by a global clock module, other different modules to operate in an orderly and cooperative manner.

Beneficial effects: the present invention has significant advantages over the prior art in that: 1. the present invention aims to reduce the power consumption of the existing control system by using a memristor neuromorphic circuit, and improve the endurance and the ability of performing a larger-scale neural network of an intelligent robot; 2. the present invention directly uses the memristor to simulate a weight in a biological neural network, which effectively simplifies the system structure, reduces complexity and improves the response speed.

DETAILED DESCRIPTION

The robot control system based on a memristive crossbar array provided by the present invention comprises: a sensor group, an input sensing signal modulator, a neuromorphic circuit, an output control signal modulator, an output device, an external supervisor module and a training controller, wherein the neuromorphic circuit comprises N groups of cascaded memristor circuits, and the memristor circuit comprises a memristor crossbar array, a differential amplifying circuit and a multiplexing switch, wherein N≥1.

The sensor group including various sensors such as image sensors, sound sensors, temperature sensors, and pressure sensors acquires relevant information in the complex detection environment, and converts the respective physical quantity in the environment into electric quantity; the sensors in the system can be any type of any number of sensors, such as optical sensors, electrical sensors, pressure sensors, temperature sensors, and sound sensors.

The input sensing signal modulator is configured for amplifying the electric quantity transmitted by each sensor to a proper range and modulating signal waveforms, and a number of the sensors corresponds to a number of channels of input signals one by one.

The differential amplifying circuit and the multiplexing switch are connected to the memristor crossbar array, an input signal vector is multiplied by a weight matrix stored in the memristor crossbar array through the memristor crossbar array, and then one or more channels of analog output signals are obtained through the differential amplifying circuit; the multiplexing switch is configured for performing weight updating operation on the memristor in the training process, and the other end of the multiplexing switch is connected with the training controller.

Specifically, the core of the neuromorphic circuit is composed of a memristor crossbar array, and the memristor crossbar array is composed of word lines, bit lines and memristors at the cross points. The memristor crossbar array allows electronic elements of other non-memristors to be added, such as transistors and diodes, without departing from the spirit of the present invention on the premise of keeping the circuit network structure thereof. The neuromorphic circuit has a neural network structure in a circuit structure, and an electrical conductance value of the memristor in the neuromorphic circuit is used as a weight value of synapses in the neural network.

Also, the memristive device herein refers to a device whose resistance can be changed according to an electrical stimulus, and any material of memristors can be used in the present invention without departing from the spirit of the present invention, and are within the protection scope of the present invention.

In order to implement the function of the simulated neural synaptic network, the neuromorphic circuit also requires some peripheral circuit modules to assist the operation of the memristor array. These peripheral circuit modules comprise signal differentiators, nonlinear modules, and multiplexing switches. The signal differentiator is configured for differentiating two paths of memristor signals, so that negative value weight can be introduced into the memristive neural network. Nonlinear elements may be added to introduce or enhance nonlinearity in the multilayer network.

In addition, a multiplexing switch module is also needed in the neuromorphic circuit and is mainly configured for performing weight updating operation on the memristor in the training process. The scale of the neural network, i.e., the number of layers, is defined by the structure of the neuromorphic circuit.

The output control signal modulator is connected with an output end of the neuromorphic circuit, modulates the analog output signals into signals that are matched with and drive the output device, such as pulse width signals, amplitude signals and frequency signals.

The output device receives the modulated signals to drive a robot to generate respective reactions. The output device mainly includes various types of motors, lighting devices, sound devices, heating devices and the like. Similarly, the type of the output device herein is determined by actual application requirements, and different types of output devices do not depart from the spirit of the present invention.

The external supervisor module and the training controller are configured for supervised learning.

The external supervisor module is configured for determining whether a route of a robot is correct or not according to responses made by the robot in the training stage and controlling the positive and negative of pulses entering the memristor; and the training controller is configured for controlling an electrical stimulation signal to flow into relevant specific memristor in combination with results of the external supervisor module and in conjunction with the multiplexing switch according to the signals given by current sensor and output signals of the neuromorphic circuit in the training stage, so that a weight of the memristor is replaced, the iteration times are preset, and the supervised learning of the system is completed. The above description is manifested in behaviors of a robot that the robot can have different input-output mapping relationships, which ultimately enables the robot to master and optimize new skills under supervised learning.

Furthermore, the system further comprises a pulse generating device, connected with the training controller, for generating electrical excitation for updating the weight of the memristor.

The system further comprises a power supply module for supplying all other modules with power; and a global clock module for coordinating other different modules to operate in an orderly and cooperative manner.

The present invention provides a new method for intelligent robot technology. The operation of the biological neural network is directly simulated on the hardware circuit through the connection of the neural network structure of the memristive circuit and the modulation effect of the memristor on the analog signals. According to the present invention, a memristive neuromorphic circuit is used as a control core of the robot, and an analog circuit with a neural network structure based on a memristor is used for generating an input-output mapping relationship, so that the robot generates different actions in different environments. Theoretically, a neural network has the ability of approximating any function, and a neural network constructed by a memristive neuromorphic circuit on hardware also has the same ability. In the present invention, the memristive neuromorphic circuit can adjust the internal connection parameters through a learning and training process, thereby approaching an ideal input-output mapping relationship. The above description is manifested in behaviors of a robot that the robot can learn the content taught in the supervised learning process after the supervised learning process, make a desired response in different environments, generalize to scenes which have not been learned before, and make a reasonable and correct response.

By utilizing the novel method based on the memristive neuromorphic circuit, the manufactured robot can realize lower power consumption and higher response speed by a simpler structure. Therefore, this opens a way for realizing the robot with a large scale of neural network.

The following is a specific embodiment of the patrolling robot manufactured under the control system provided by the present invention.

Figure 3:
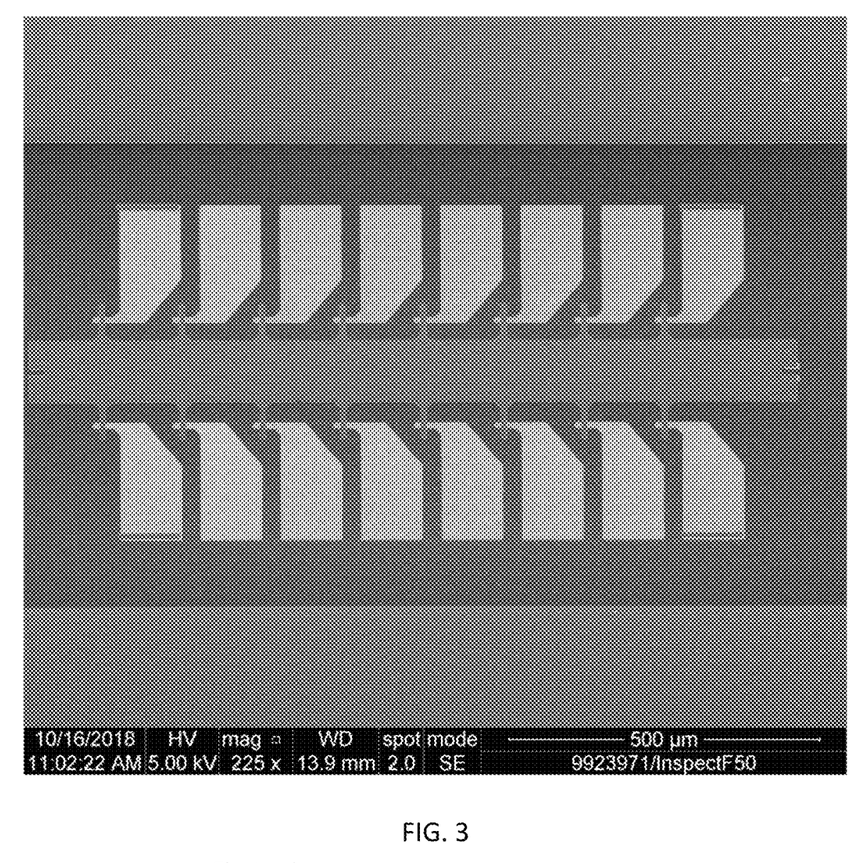
FIG. 3 is an electron microscope photograph of a memristor array with a neural network structure in an autonomous driving tracking robot based on a memristive neuromorphic circuit according to an embodiment of the present invention.
Figure 4:
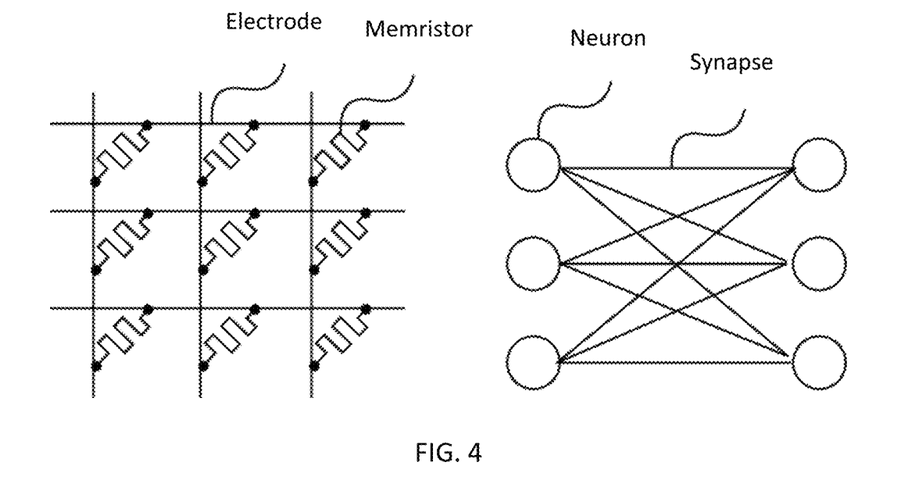
FIG. 4 is a comparison diagram of the structure of an example memristor crossbar array with a structure of a layer of fully-connected neural network in an embodiment of the present invention.

The embodiment provides a prototype of a robot car based on a memristive neuromorphic circuit, and shows that the robot has the ability of tracking through the learning process; therefore, the feasibility of the robot is verified, and an experimental conclusion that the memristive neuromorphic circuit has extremely high response speed (about 56 ns) is obtained. The specific implementation process is as follows:

firstly, a memristor with a structure of 40 nm target/80 nm tantalum/10 nm tantalum oxide/40 nm target is prepared by micromachining technologies such as ultraviolet mask lithography, electron beam evaporation, magnetron sputtering, and atomic layer deposition, as shown in a scanning electron microscope photograph in FIG. 3; the memristor has a good adjustable property, and the resistance value thereof can be continuously changed between 100 ohms and 4000 ohms after being excited by electrical pulses; then, a cross circuit structure is constructed by utilizing the memristor, and the structure is equivalent to a structure of a layer of fully-connected neural network. As shown in FIG. 4, the left diagram is a 3×3 memristor crossbar array, and the right diagram is a 3×3 fully-connected neural network; the both have the same topological structure with memristors as synapses and electrode endpoints as neuron endpoints, so the both have the same structure. In this embodiment, a neuromorphic circuit is used as the one-layer structure of the neural network, and multiple layers of circuits may also be used as the multiple layers of the neural network for experiments to obtain the learning results.

Figure 1:
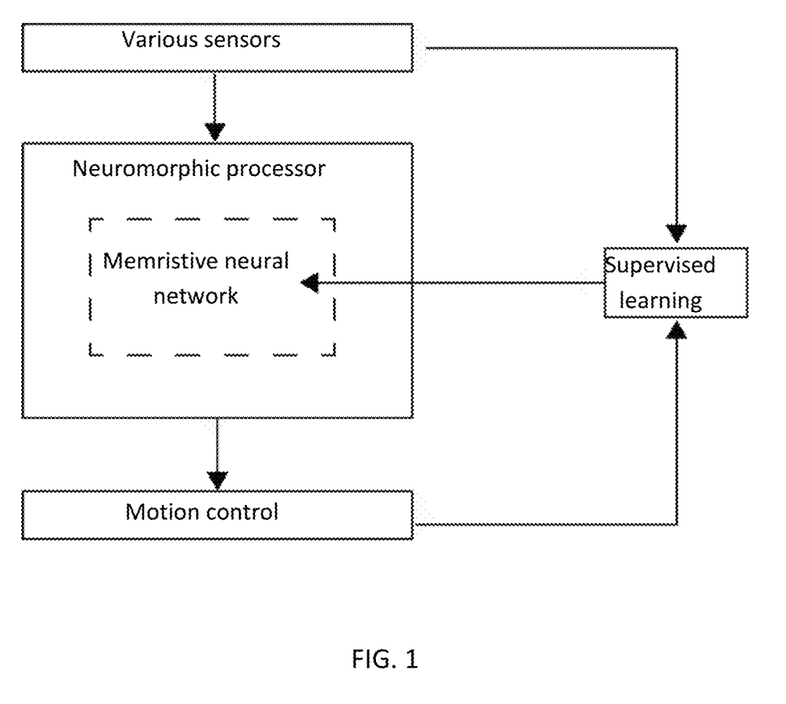
FIG. 1 is a diagram of an information flow of the system of the present invention.
Figure 2:
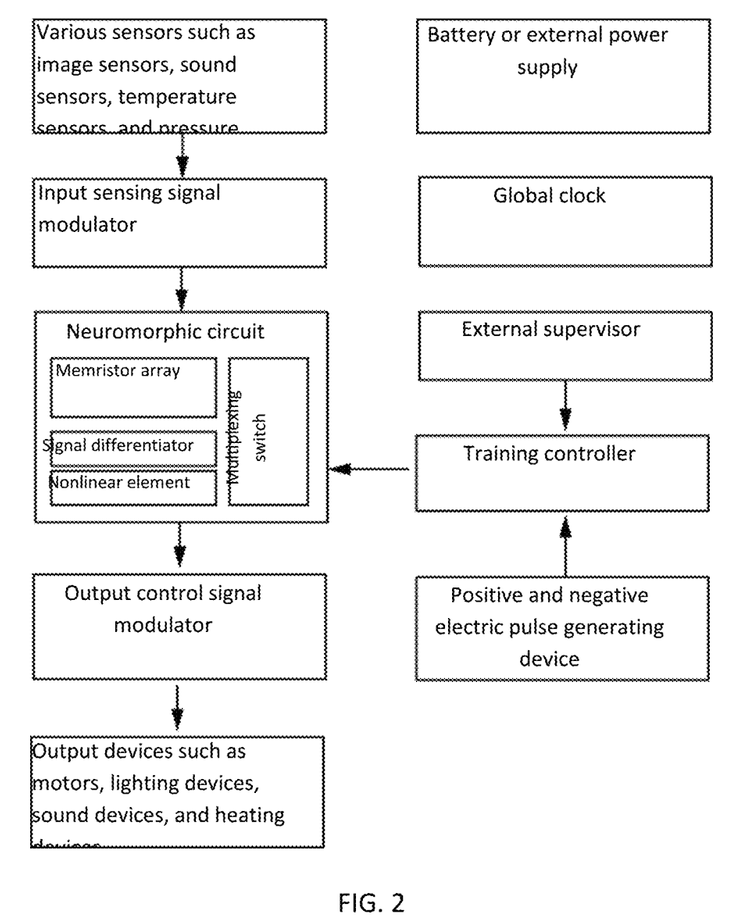
FIG. 2 is a schematic diagram of the structures and connections of various circuit modules included in the system of the present invention, wherein separate modules represent acting on all other modules.
Figure 5:
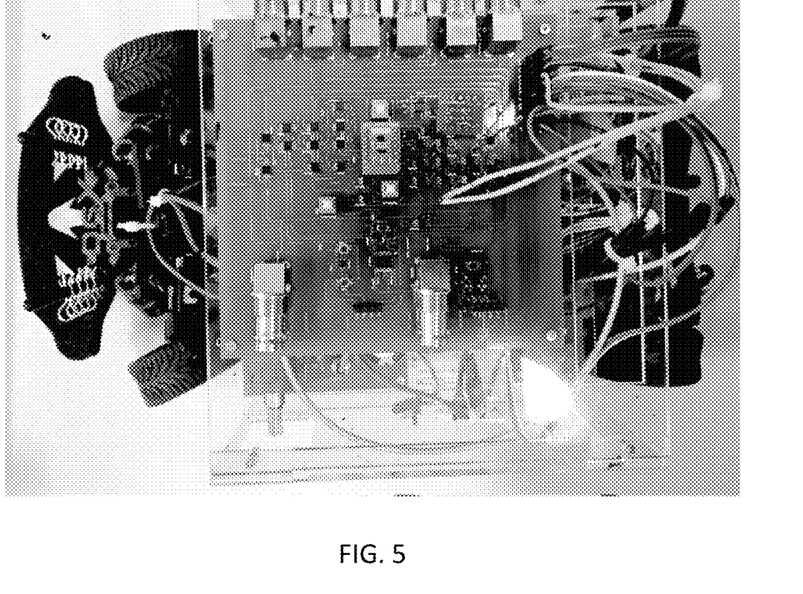
FIG. 5 is a photograph of a prototype of an autonomous driving tracking robot based on a memristive neuromorphic circuit according to an embodiment of the present invention.

According to the structure shown in FIG. 2, the robot car shown in FIG. 5 is constructed as a prototype of the memristor neuromorphic-based car.

In this embodiment, the modules shown in FIG. 5 are integrally assembled by a printed circuit board. The details are described below. Two light intensity sensors are mounted on a front portion of a chassis of the robot car, and the sensors can detect the light of a road on the front portion of the chassis based on the principle of a photosensitive resistor. The detected light intensity information is converted into a voltage signal, and when the light changes from strong to weak, the voltage changes from high to low. The voltage signal is reduced to be within 0.2 V and then input into a neuromorphic circuit for processing. The memristor array is led to the printed circuit board through bonding wires. The output signal is a product of the input signal and a weight matrix stored in the memristor array through the memristor crossbar array circuit, and then one path of analog output signals are obtained through the differential amplifying circuit. The analog output signals are modulated into pulse width modulation signals under the action of an output control modulator, which further controls the steering of the front wheel steering gear. In this embodiment, in the operating mode of the robot, the robot will process the signals detected in real time and respond with a direction of the rotation of the front wheels. It is noted that the control system in the assembly construction of the robot is completely based on the memristive neuromorphic circuit without adopting any digital processor, which shows that this embodiment strictly complies with the design of the present invention.

Figure 6:
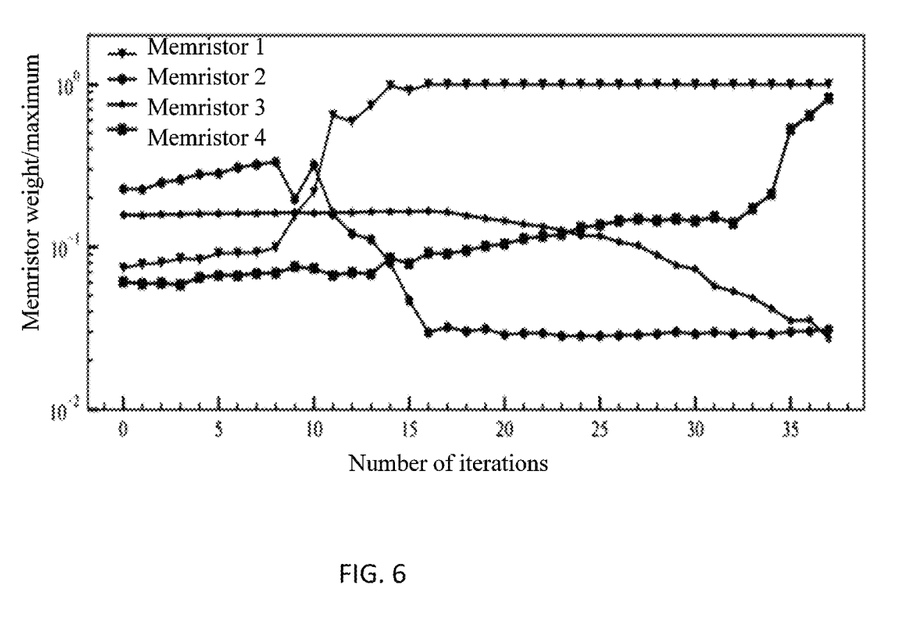
FIG. 6 is a diagram illustrating the weight transformation of memristive synapses when a prototype of an autonomous driving tracking robot based on a memristive neuromorphic circuit executes a learning task according to an embodiment of the present invention.
Figure 7:
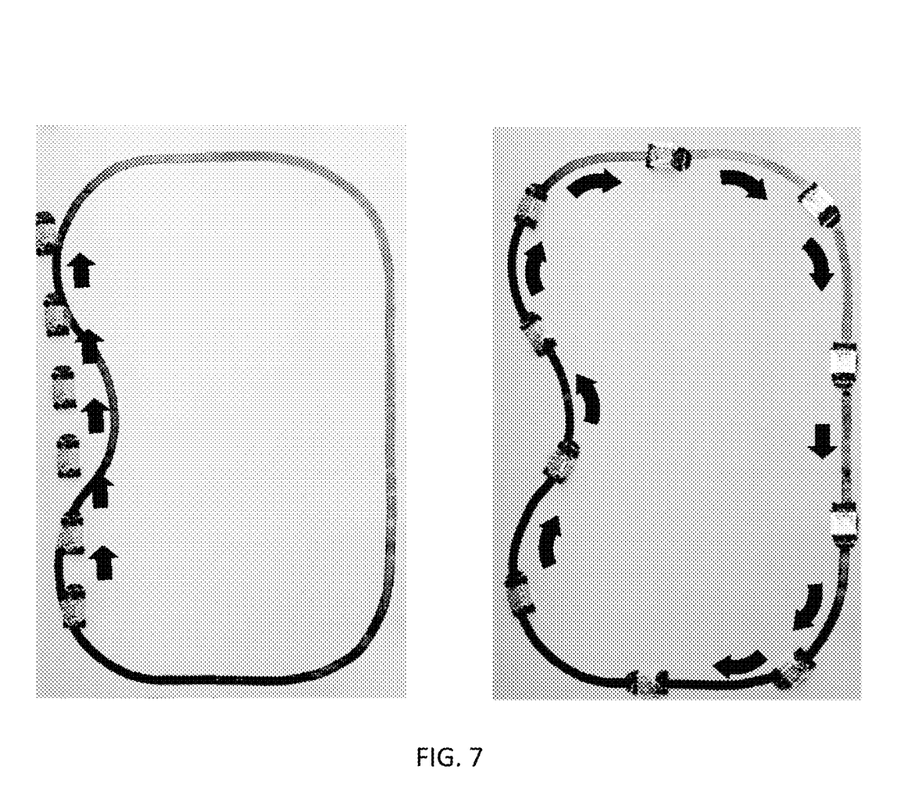
FIG. 7 is a comparison diagram of tracking task execution before and after learning and training of a prototype of an autonomous driving tracking robot based on a memristive neuromorphic circuit according to an embodiment of the present invention.

In this embodiment, the robot may be set to a learning mode to train the robot to perform a specific task. In the learning mode, an onboard pulse signal generator outputs pulse signals, and the pulse signals are inputted into a memristor through a multi-channel multiplexer according to a set weight value updating method to achieve weight value updating. In this embodiment, the robot car will be trained to perform a tracking task. The robot is placed in a special environment, an external supervisor module determines whether the response of the robot is correct or not according to the response of the robot, and controls the positive and negative of pulses entering the memristor. Each pass through all memristors is referred to as an iterative process. As shown in FIG. 6, the maximum weight in the iterative process and the memristor weight of each iteration are recorded, and the weights are normalized by using the memristor weight/maximum weight; the weight values of 4 memristors in this embodiment change significantly after the memristors undergo 37 iterations. The behaviors of the robot car also change as shown in FIG. 7. It is demonstrated that the car as an intelligent robot has the ability to learn to perform specific tasks as shown from the left of FIG. 7 in which the robot car has no ability of performing tasks to the right of FIG. 7 in which the robot car can complete the tracking task completely, which verifies the effectiveness and feasibility of the present invention.

Figure 8:
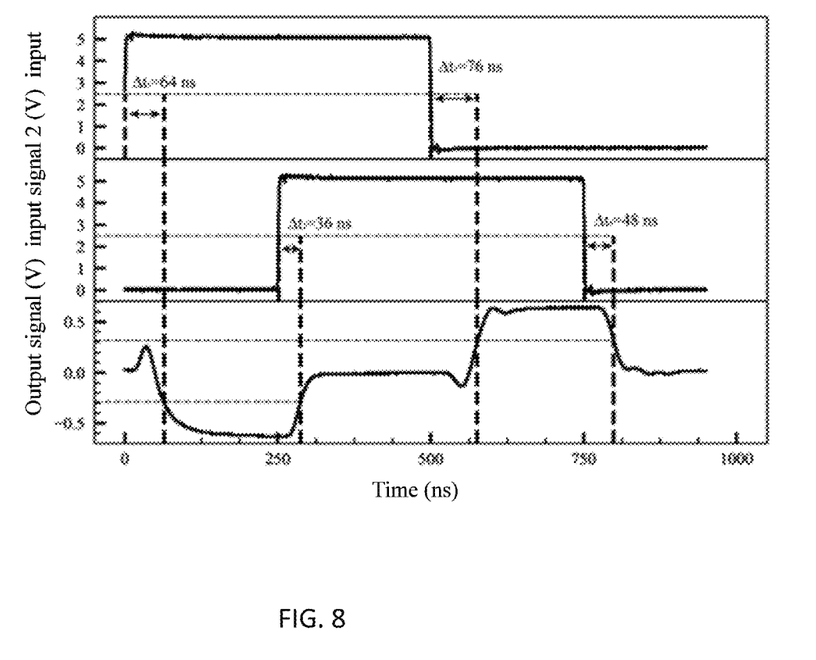
FIG. 8 is a response speed characterization diagram of a memristive neuromorphic circuit in an embodiment of the present invention.

At last, the present inventor tests the response speed of the memristive neuromorphic circuit used by the robot car, as shown in FIG. 8. It can be seen that the average response speed of the circuit from input to output is 56 ns with the half-swing point as the standard, which is a hundred times better than the usual embedded single-chip processor. The result shows that the memristive neuromorphic circuit can achieve faster real-time response speed based on the simpler structure and the computation process.

The present invention further provides a robot control method based on a memristive crossbar array, which comprises:

(1) converting, by a sensor group, respective physical quantity into an electric quantity as an input signal after acquiring relevant information in an environment;

(2) inputting the input signal into an input sensing signal modulator for modulating to obtain the modulated input signal;

(3) inputting the modulated input signal into a memristor crossbar array of a neuromorphic circuit, multiplying an input signal vector by a weight matrix stored in the memristor crossbar array through the memristor crossbar array, then obtaining one or more channels of analog output signals through the differential amplifying circuit, and driving a robot to generate respective reactions;

(4) supervising, by an external supervisor module, a robot behavior and iterating steps (5) and (6) until a behavior mode of the robot is updated into an expected behavior mode;

(5) determining, by the external supervisor module, whether the robot behavior is correct or not and sending the result to a training controller; and (6) controlling, by the training controller, an electrical stimulation signal to flow into relevant specific memristor such that a weight of the memristor is replaced, and the weight value of the neuromorphic circuit is changed, wherein the determination result is specifically that: if the behavior is correct, a larger weight is strengthened and a smaller weight is weakened; if the behavior is wrong, the smaller weight is strengthened and the larger weight is weakened.

Furthermore, the neuromorphic circuit has a neural network structure in a circuit structure, and an electrical conductance value of the memristor in the neuromorphic circuit is used as a weight value of synapses in the neural network.

Furthermore, the memristor crossbar array is composed of word lines, bit lines and memristors at the cross points. Furthermore, the method further comprises supplying, by a power supply module, other modules with power; and coordinating, by a global clock module, other different modules to operate in an orderly and cooperative manner.

What is claimed is:

1. A robot control system based on a memristive crossbar array, comprising: a sensor group, an input sensing signal modulator, a neuromorphic circuit, an output control signal modulator, an output device, an external supervisor module and a training controller, wherein the neuromorphic circuit comprises N groups of cascaded memristor circuits, and the memristor circuit comprises a memristor crossbar array, a differential amplifying circuit and a multiplexing switch, wherein N≥1, the sensor group is configured for acquiring relevant information in an environment and converting respective physical information quantity in the environment into electric quantity;

the input sensing signal modulator is configured for amplifying the electric quantity transmitted by each sensor to a proper range and modulating signal waveforms, and a number of the sensors corresponds to a number of channels of input signals one by one;

the differential amplifying circuit and the multiplexing switch are connected to the memristor crossbar array, an input signal vector is multiplied by a weight matrix stored in the memristor crossbar array through the memristor crossbar array, and then one or more channels of analog output signals are obtained through the differential amplifying circuit; the multiplexing switch is configured for performing weight updating operation on the memristor in the training process, and the other end of the multiplexing switch is connected with the training controller;

the output control signal modulator is configured for connecting an output end of the neuromorphic circuit, modulating the analog output signals into signals that are matched with and drive the output device;

the output device is configured for receiving the modulated signals to drive a robot to generate respective reactions;

the external supervisor module is configured for determining whether a route of a robot is correct or not according to responses made by the robot in the training stage and controlling the positive and negative of pulses entering the memristor; and the training controller is configured for controlling an electrical stimulation signal to flow into relevant specific memristor in combination with results of the external supervisor module and in conjunction with the multiplexing switch according to the signals given by current sensor and output signals of the neuromorphic circuit in the training stage, so that a weight of the memristor is replaced.

2. The robot control system based on a memristive crossbar array according to claim 1, wherein the neuromorphic circuit has a neural network structure in a circuit structure, and an electrical conductance value of the memristor in the neuromorphic circuit is used as a weight value of synapses in the neural network.

3. The robot control system based on a memristive crossbar array according to claim 1, wherein the memristor crossbar array is composed of word lines, bit lines and memristors at the cross points, and the memristor crossbar array allows electronic elements of other non-memristors to be added on the premise of keeping the circuit network structure thereof.

4. The robot control system based on a memristive crossbar array according to claim 1, wherein the system further comprises a power supply module for supplying all other modules with power; and a global clock module for coordinating other different modules to operate in an orderly and cooperative manner.

5. The robot control system based on a memristive crossbar array according to claim 1, wherein the system further comprises:

a pulse generating device, connected with the training controller, for generating electrical excitation for updating the weight of the memristor.

6. The robot control system based on a memristive crossbar array according to claim 1, wherein the neuromorphic circuit further comprises a nonlinear element connected to the memristor array.

7. A robot control method based on a memristive crossbar array, comprising:

i) converting, by a sensor group, respective physical quantity into an electric quantity as an input signal after acquiring relevant information in an environment;

ii) inputting the input signal into an input sensing signal modulator for modulating to obtain the modulated input signal;

iii) inputting the modulated input signal into a memristor crossbar array of a neuromorphic circuit, multiplying an input signal vector by a weight matrix stored in the memristor crossbar array through the memristor crossbar array, then obtaining one or more channels of analog output signals through a differential amplifying circuit, and driving a robot to generate respective reactions after an output device receives the analog output signals;

iv) supervising, by an external supervisor module, a robot behavior and iterating steps v) and vi) until a behavior mode of the robot is updated into an expected behavior mode;

v) determining, by the external supervisor module, whether the robot behavior is correct or not and sending the result to a training controller; and vi) controlling, by the training controller, an electrical stimulation signal to flow into relevant specific memristor such that a weight of the memristor is replaced and the weight value of the neuromorphic circuit is changed, wherein the determination result is specifically that: if the behavior is correct, a larger weight is strengthened and a smaller weight is weakened; if the behavior is wrong, the smaller weight is strengthened and the larger weight is weakened.

8. The robot control method based on a memristive crossbar array according to claim 7, wherein the neuromorphic circuit has a neural network structure in a circuit structure, and an electrical conductance value of the memristor in the neuromorphic circuit is used as a weight value of synapses in the neural network.

9. The robot control method based on a memristive crossbar array according to claim 7, wherein the memristor crossbar array is composed of word lines, bit lines and memristors at the cross points, and the memristor crossbar array allows electronic elements of other non-memristors to be added on the premise of keeping the circuit network structure thereof.

10. The robot control method based on a memristive crossbar array according to claim 7, wherein the method further comprises supplying, by a power supply module, other modules with power; and coordinating, by a global clock module, other different modules to operate in an orderly and cooperative manner.

* * * * *